United States Patent [19]

Beckley

[11] Patent Number: 4,866,522
[45] Date of Patent: Sep. 12, 1989

[54] TELEVISION TRANSMISSION SYSTEM WITH MULTIPLEXED COMPONENTS

[75] Inventor: John C. Beckley, Banstead, United Kingdom

[73] Assignee: U.S. Philips Corporation, New York, N.Y.

[21] Appl. No.: 157,820

[22] Filed: Feb. 19, 1988

[30] Foreign Application Priority Data

Feb. 20, 1987 [GB] United Kingdom ............... 8704009

[51] Int. Cl.$^4$ .................... H04N 7/08; H04N 7/087; H04N 7/093
[52] U.S. Cl. .................................. 358/145; 358/147
[58] Field of Search .................. 358/12, 14, 145, 147

[56] References Cited

U.S. PATENT DOCUMENTS 4,134,127 1/1979 Campioni ........................... 358/16
4,614,974 9/1986 Maney et al. ..................... 358/147
4,633,313 12/1986 Mogi et al. ......................... 358/160

OTHER PUBLICATIONS

Storey, HDTV Motron Adaptive Bandwidth Reduction Using DATV, BBC Report BBCRD 1986/Jun. 5, 1986.
Specification of the Systems of the MAC/Packet Family, Tech. 3258E European Broadcasting Union, Oct. 1986.

Primary Examiner—John W. Shepperd
Attorney, Agent, or Firm—Michael E. Marion

[57] ABSTRACT

A component television signal is transmitted as a sequence of television frames with each frame having a plurality of television lines substantially all of which have first and second time multiplexed portions. The first portion (DB) forms the data burst and conveys sound/data information in digital form at a given bit rate while the second portion of each line outside the vertical blanking intervals (VBI) conveys vision information (U/V, Y). The second portion of at least some of the lines in the verical blanking intervals (VBI) convey additional information in digital form at a higher bit rate than the given bit rate and which may be twice the given bit rate. This additional information can be the digital channel information for a digitally assisted television signal.

22 Claims, 3 Drawing Sheets

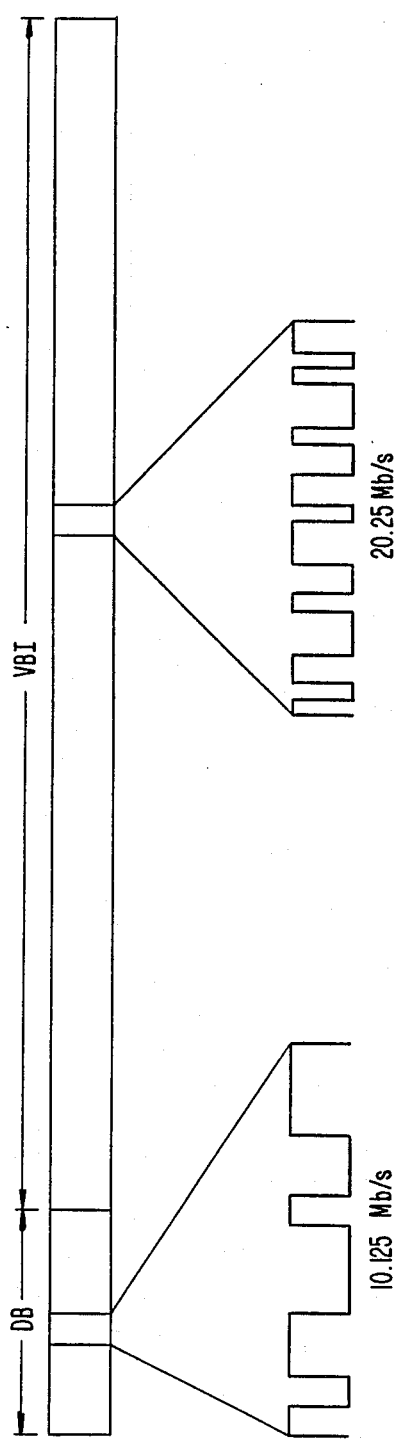

TELEVISION TRANSMISSION SYSTEM WITH MULTIPLEXED COMPONENTS

BACKGROUND OF THE INVENTION

The invention relates to a television signal transmission system in which a television signal is transmitted as a sequence of television frames each frame of which comprises a plurality of television lines with substantially all the lines of a frame having first and second time multiplexed portions, the first portion of each of said lines conveying sound/data information in digital form at a given bit rate whilst the second portion of each line outside the vertical blanking interval or intervals conveys vision information. The invention also relates to apparatus for use with such a system.

Transmission systems of the above type are described in the European Broadcasting Union (EBU) document Tech. 3258-E "Specification of the systems of the MAC/packet family" which is dated October 1986 and is incorporated herein by way of reference. This document describes a number of transmission systems of the MAC (multiplexed analogue components) type where the first portion of the majority of the lines of a frame forms a data burst of a given duration containing digital data, which can include sound, organised in packets whilst the second portion, outside the vertical blanking intervals, contains the compressed luminance and chrominance components, time multiplexed, of the vision information. Of the systems described the C-MAC/-packet system has a digital bit rate of 20.25 Mb/s with the data burst being 2-4 PSK modulated and capable of conveying the equivalent of eight high quality sound channels whilst the vision information is frequency modulated. The C-MAC/packet system is intended for use in a direct broadcasting satellite (DBS) channel. The described D-MAC/packet system is intended to convey the full information of the C-MAC/packet system in distribution systems such as cable and in this system the data burst uses duobinary coding whilst the system uses amplitude modulation. It has already been proposed elsewhere that the D-MAC/packet system could be used for transmission via a satellite with the vision information being frequency modulated. The other system described in the above document is the D2-MAC/packet system in which the data in the data burst is again duobinary coded but the bit rate is reduced to 10.125 Mb/s such that it is capable of conveying the equivalent of four high quality sound channels. If this system is to be used in a satellite channel then frequency modulation is employed whilst if the system is to be used in a channel of restricted bandwidth e.g. in a distribution system then amplitude modulation is employed.

There have been recent proposals to transmit high definition television signals using one of the MAC/-packet systems these proposals being generally referred to as HD-MAC. At the same time certain broadcasting organisation have announced their intention to commence their DBS services using the reduced specification D2-MAC/packet system.

SUMMARY OF THE INVENTION

It is an object of the invention to provide a television signal transmission system and apparatus which, amongst other things, is capable of being used as a compatible step between a reduced specification and a high definition component television system.

The invention provides a television signal transmission system in which a television signal is transmitted as a sequence of television frames each frame of which comprises a plurality of television lines comprising a first group of lines occurring within said vertical blanking interval and a second group of lines occurring outside of said vertical blanking interval, with substantially all the lines of a frame having first and second time multiplexed portions, the first portion of each of said lines conveying first information for example sound-/data information in digital form at a first bit rate while the second portion of each line outside the vertical blanking interval or intervals conveys vision information, characterised in that the second portion of at least some of the lines within the or a vertical blanking interval, i.e. a first number of said first group of lines, convey second, i.e. additional information in digital form at a second bit rate which is higher than said first bit rate.

Such a system has the advantage that if it is intended to use a higher bit rate for the sound/data information at some later date then the additional information is already at this bit rate.

If each frame comprises two television fields each containing a vertical blanking interval then the invention may be further characterised in that the second portion of at least some of the lines within both vertical blanking intervals of a frame may convey said additional information. This would be the case with interlaced television systems.

The invention may be further characterised in that said additional information may be conveyed in the majority of the lines of the or each vertical blanking interval of a frame.

In a preferred system according to the invention the said higher bit rate may be twice that of the given bit rate.

The invention may also be characterised in that the second portion of any remaining lines in said vertical blanking interval or intervals, i.e. a second number of said first group of lines, may convey further information (i.e. third information) in digital form at the said given rate. Such further information may be teletext information.

Such a system may be capable of transmitting high definition television signals where the vision information forms the analogue channel information for a digitally assisted television signal. In such a case the system may be characterised in that the additional information forms the digital channel information for the digitally assisted television signal which conveys control and other information for enhancement of the vision information.

The invention also relates to television transmission apparatus for use with the above transmission system which apparatus comprises means for generating sound-/data information, means for assembling said sound-/data information in digital form at a given bit rate in a first portion of substantially all the lines of a television frame, means for generating vision information and means for assembling said vision information in a second portion of those of said lines of the television frame outside the vertical blanking interval or intervals, characterised in that said apparatus further comprises means for generating additional information and means for assembling in the second portion of at least some of the lines within the or a vertical blanking interval said additional information in digital form at a bit rate which is higher than that of said given bit rate.

Where the apparatus is for use with a transmission system in which each frame comprises two television fields each containing a vertical blanking interval, the invention may be further characterised in that said means for assembling said additional information may assemble said additional information in the second portion of at least some of the lines within both blanking intervals of a frame.

Preferably the means for assembling said additional information assembles said additional information in the majority of the lines of the or each vertical blanking interval.

Where the vision information is derived from a high definition television signal and forms the analogue channel information for a digitally assisted television signal, the apparatus may be further characterised in that it comprises means for deriving from said high definition television signal control and other information for picture enhancement which control and other information forms the said additional information and constitutes the digital channel information of the digitally assisted television signal.

The invention additionally relates to television receiving apparatus for use with the above television transmission system which apparatus comprises means for receiving a television signal of the type specified, means for deriving from the received signal the sound-/data information from the first portion of substantially all the lines of a television frame and means for deriving from the received signal the vision information from the second portion of the lines which are outside the vertical blanking interval or intervals, characterised in that said apparatus further comprises means for deriving said additional information from the second portion of at least some of the lines within the, a, or each vertical blanking interval.

Where the vision information forms the analogue channel information of a digitally assisted television signal the invention may be further characterised in that the additional information comprises the digital channel information of the digitally assisted television signal, the apparatus further comprising means for deriving from this additional information control and other information for enhancing the derived vision information to provide a high definition television signal.

BRIEF DESCRIPTION OF THE DRAWINGS

The above and other features of the invention will now be described, by way of example, with reference to the accompanying drawings in which:

FIG. 1a shows a television line in accordance with the present invention.

DETAILED DESCRIPTION OF THE INVENTION

When any new system is introduced there is always a desire at the outset to keep the system as simple as possible in order that (in the case of a television system) the receiving equipment is not too complex and initially not prohibitively expensive whilst demand is low. However, the system should be capable of expansion so that the full benefits may be obtained in time whilst such expansion should not render early built receiving equipment obsolete. With this in mind it is our proposal that a satellite broadcast system should be introduced in three phases, these being:

i. Phase 1 - a start up phase with a signal complying with the D2-MAC/packet system as defined in the above EBU document.

ii. Phase 2 - an intermediary phase with a signal which is a modification of the above D2-MAC/packet system. At this phase reduced specification high definition television would be introduced with a 16:9 aspect ratio.

iii. Phase 3 - a final phase with a signal which is a modification of the D-MAC/packet system defined in the above document. In this phase the full capacity of the channel can be utilised and full specification high definition television introduced.

Phase 3 should not be introduced until all receivers built for the phase 1 transmissions are notionally life expired while receivers built for phase 2 reception should be capable of receiving phase 1 transmissions as well as phase 3 transmissions though in the latter case with high definition television interpreted in reduced specification mode.

Figure 1:
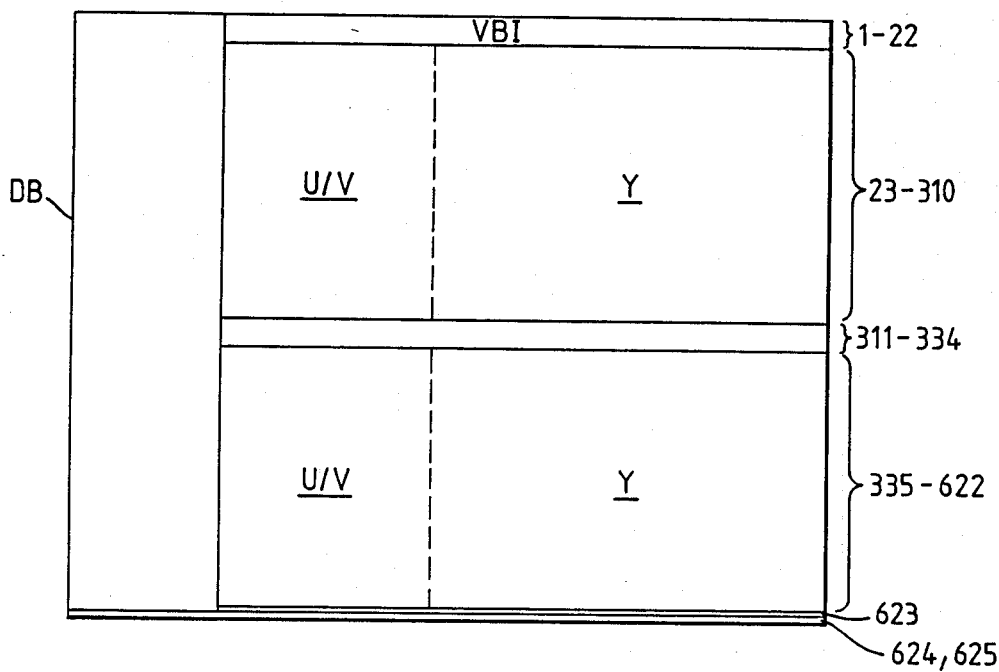
FIG. 1 shows diagramatically a frame of a television signal for use with the present invention.

FIG. 1 shows diagramatically and not to a particular time scale the structure of a frame of a television signal within the specification of the D2-MAC/packet system for phase 1. This signal frame occupies a period of 40 ms and each frame comprises 625 line periods of 64 $\mu$s each with the line period being assumed to be across the figure. Appropriate line numbers are indicated on the right hand side of FIG. 1. The last two lines of the frame, 624 and 625, contain only reference signals and specific data as defined in the above EBU document. The first portion (approx, 10 $\mu$s) of each of the lines 1 to 623 inclusive comprises the data burst DB during each of which, in addition to a synchronising word, digital data is conveyed at the bit rate of 10.125 Mb/s as shown in FIG. 1a. The second portion of lines 1 to 22 inclusive form a first vertical blanking interval VBI most of which are blank but some of which, say lines 17 to 22 inclusive, convey fixed format teletext signals which are in digital form and are at the same bit rate of 10.125 Mb/s. The second portion of lines 23 to 310 inclusive contain the first field of the vision information shown here as a time compressed colour difference signal component U/V followed by the time compressed luminance signal component Y although in practice these two components will be scrambled by a form of line cut rotation. The second portion of lines 311 to 334 inclusive form the second vertical blanking interval VBI and as with the first vertical blanking interval most of the lines are blank while some, say lines 329 to 334 inclusive, also convey fixed format teletext signals while another line, say 312, will contain insertion test signals. Lines 335 to 622 during their second portion contain the second field of the vision information while the second portion of line 623 contains insertion test signals.

For phase 2 the content of the frame period of FIG. 1 remains much the same as for phase 1 with the data burst bit rate, lines 624 and 625 data, test insertion signals and luminance information periods unchanged. At least some of the second portions of the lines which form the two vertical blanking intervals convey as additional information the digital channel information for a digitally assisted television signal (DATV) of which the vision components U/V and Y form the analogue channel information. As shown in FIG. 1a, for data in binary form, it is proposed that these second portions of the lines forming the vertical blanking intervals, or at least those not conveying teletext signals if such are present, should convey in digital form the control and other information to enable the transmitted picture to be enhanced at the receiver, this data being transmitted at a bit rate of 20.25 Mb/s which is twice the bit rate used for the data burst or the teletext signals (if present). A proposal for DATV has been published by the British Broadcasting Corporation in their Research Department Report BBC RD 1986/5 "HDTV motion adaptive bandwidth reduction using DATV" by R. Storey, dated June 1986 as well as at the 1986 International Broadcasting Convention. It will be appreciated that a receiver designed to receive a phase 1 transmission which will ignore the blank lines in the vertical blanking intervals will also be capable of receiving a phase 2 transmission ignoring the DATV information in the vertical blanking intervals. The picture displayed by such a phase 1 receiver will depend only on the content of the analogue vision information which will therefore not be enhanced.

Figure 2:
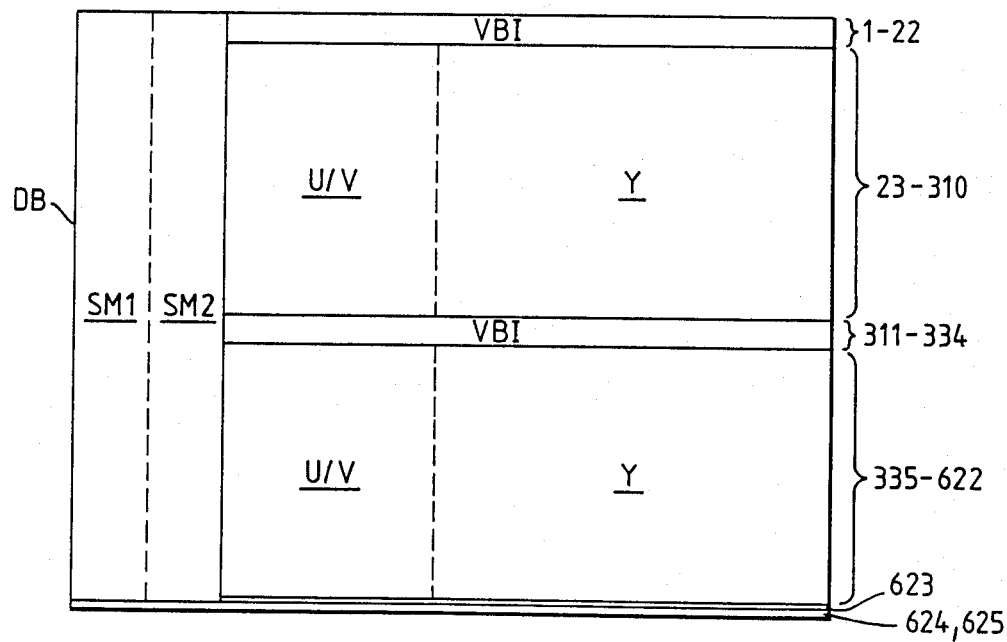
FIG. 2 shows diagramatically a modification of the frame of FIG. 1.

For phase 3 the content of the frame period is shown diagrammatically in FIG. 2 where like references correspond to those used in FIG. 1. The vertical blanking intervals, the periods of vision information and the total data burst are the same for this modification of the D-MAC/packet system as for the D2-MAC/packet system. However the data burst is divided into two sub-multiplexes SM1 and SM2 and the data rate for the digital information in these sub-multiplexes is 20.25 Mb/s which is twice that for the data burst in the D2-MAC/packet system and thus is capable of carrying twice the information. The second portions of the lines forming the vertical blanking intervals will again convey the digital channel information for DATV at the same bit rate as for phase 2 which will hence be at the same bit rate as the data burst as will be the reference and data signals in lines 624 and 625. Teletext signals can be removed from the few lines of the vertical blanking intervals and placed in the sub-multiplexes thus giving more DATV information in these intervals than conveyed during phase 2. It is also possible to employ at this phase two sets of compression ratios for the vision information. Further DATV information can also be conveyed in one of the sub-multiplexes if the equivalent of less than eight high quality sound channels are required with the transmission.

Figure 3:
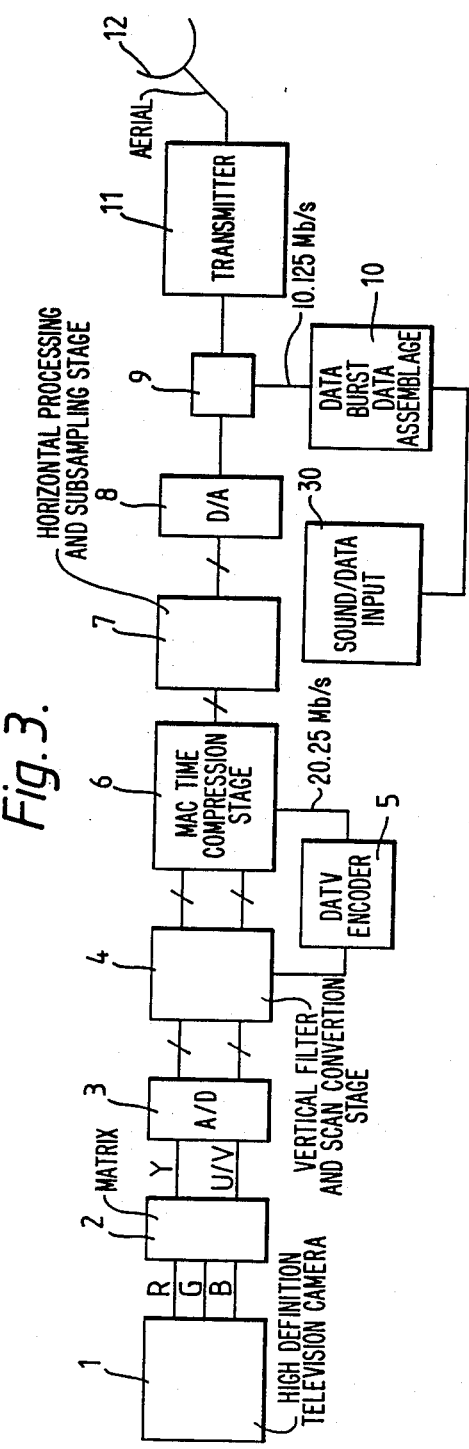
FIG. 3 is a block diagram of transmission equipment for use with the present invention.

FIG. 3 is a block diagram of transmission equipment for use at the phase 2 stage with only those parts being shown which are considered necessary for an understanding of the invention. Reference 1 indicates a high definition television camera for generating a television picture signal having, for example, 1250 lines, 2:1 interlace, 50 fields per second and an aspect ratio of 16:9. The red (R), green (G) and blue (B) signals, which are in analogue form, are applied to a matrix 2 to produce luminance Y and colour difference signals U/V which are applied to an analogue-to-digital converter 3. The resulting digital signals, which are in parallel form, are applied to a vertical filter and scan conversion stage 4 where the picture signal is converted into a 625 line picture signal retaining the other characteristics. Information required for the digital channel for DATV purposes is derived from this stage and applied to a DATV encoder 5. The 625 line signal from stage 4 is applied to a MAC time compression stage 6 in which the luminance and chrominance components are appropriately time compressed and assembled in their correct order, scrambled or not by a form of line-cut rotation. The control and additional information generated by the DATV encoder 5 is added to the picture signal during all or certain of the second portions of the lines in the vertical blanking intervals, this information being in digital form and such that it results in the data eventually being transmitted having a bit rate of 20.25 Mb/s. The assembled signal produced by the stage 6 is applied to a horizontal processing and subsampling stage 7 whose output is applied to a digital-to-analogue converter 8. This converter produces an analogue picture signal together with the digital components of the DATV signal which is applied to a first input of an adder stage 9. A second input of the adder stage 9 is shown connected to a block 10 in which first information, for example sound/data for the data burst provided at input 30 is assembled at a bit rate of 10.125 Mb/s. The method of generating the data for the data burst or its assembly will not be gone into any detail as it is not important for an understanding of the invention. The combined signal from adder stage 9 is applied to a transmitter 11 for amplification and conversion to the transmission frequency and whose output is applied to an aerial 12 for transmission to the appropriate satellite if that be the mode conveying the signal.

Figure 4:
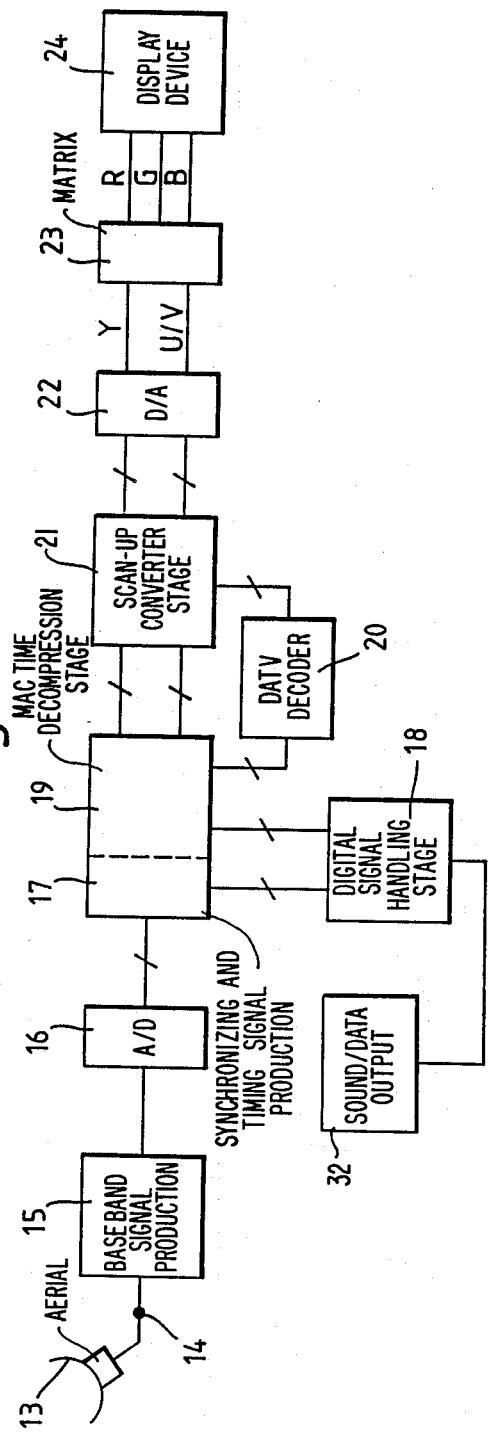
FIG. 4 is a block diagram of receiving equipment for use with the present invention.

FIG. 4 is a block diagram of receiving equipment for use at the phase 2 stage though as described above it will also operate with signals at the phase 1 and phase 3 stages. Only those parts are shown which are considered necessary for an understanding of the invention. The signal from the satellite is received by an aerial 13 and down converted before application to the input 14 of a receiver. In the receiver the signal is further processed in known manner in a block 15 to produce at its output a baseband signal which is applied to an analogue-to-digital converter 16. The resulting digital signal in parallel bit form is applied to a stage 17 which acquires the data from the data burst and from this produces synchronising and timing signals for use in the receiver. The remaining data in the data burst is applied to a digital signal handling stage 18 where the various signals from the packet multiplex are decoded to provide the various signals, including sound (at output 32) and authorisation, that they contain. This is not shown in further detail as it is not important for an understanding of the invention. The signal from the converter is also applied to a MAC time decompression stage 19 in which the vision signal is decompressed and formed into its luminance Y and chrominance U/V components. If scrambling of this signal has taken place at the transmitter descrambling will take place in the decompression stage 19 under the control of signals in the data burst for which reason a connection is shown between the stages 18 and 19. The DATV data in the second portions of the appropriate lines in the vertical blanking interval are separated from the vision signal in the stage 19 and applied to a DATV decoder 20. The luminance and chrominance signals are applied to a scan-up converter stage 21 in which the received 625 line signal is converted to a 1250 line picture signal and in this stage the signals produced by the DATV decoder 20 are employed to enhance the converted picture signal. The enhanced up-converted signal is applied to a digital-to-analogue converter 22 whose Y and U/V analogue outputs are applied to a matrix 23 to produce R,G,B, signals which are employed by a display device 24 to produce a 1250 line high definition display.

Although in the above description particular details are given as to line and field rates, interlacing, aspect ratios etc., it will be appreciated that the above described system and equipment can be used with television signals having other parameters. In addition it is not necessary for the television signal to be conveyed by way of a satellite broadcast transmission but could be by way of a cable system.

While in the system described above the additional information is stated to be the digital channel information for DATV it could alternatively convey any other form of data such as authorisation data or subscription addressing.

I claim:

1. In a television transmission system in which a television signal is transmitted as a sequence of frames, each frame comprising at least one vertical blanking interval and a plurality of lines comprising a first group of lines occurring within said vertical blanking interval and a second group of lines occurring outside of said vertical blanking interval, substantially all of said first and second groups of lines having first and second time multiplexed portions, said first portion of said first and second groups of lines conveying first information in digital form at a first bit rate and said second portion of said second group of lines conveying vision information, characterized in that:

said first group of lines comprises a first number of lines and a second number of lines, and said second portion of said first number of lines conveys second information in digital form at a second bit rate which is higher than said first bit rate.

2. A transmission system as claimed in claim 1, in which each frame comprises two television fields each containing a vertical blanking interval.

3. The transmission system as claimed in claim 2 wherein said second bit rate is twice that of said first bit rate.

4. The transmission system as claimed in claim 2 wherein said second information is related to said vision information.

5. A transmission system as claimed in claim 1 wherein the majority of the lines of each vertical blanking interval forms said first number of lines and the remaining lines form said second number of lines.

6. A transmission system as claimed in claim 5 wherein said second portion of said second number of lines conveys third information in digital form at said first bit rate.

7. Television receiving apparatus for use with a television transmission system as claimed in claim 6, said apparatus comprising means for receiving said television signal, means for deriving from said received signal said first information and means for deriving from said received signal the vision information from the second portion of said second group of lines, wherein said apparatus further comprises means for deriving said second information from the second portion of said second number of lines.

8. Receiving apparatus as claimed in claim 7, wherein said apparatus additionally comprises means for deriving said third information from the second portion of any remaining lines in said vertical blanking interval or intervals.

9. The transmission system as claimed in claim 5 wherein said second bit rate is twice that of said first bit rate.

10. A transmission system as claimed in claim 1, wherein said second bit rate is twice that of said first bit rate.

11. The transmission system as claimed in claim 10, wherein said second information is related to said vision information.

12. A transmission system as claimed in claim 11, in which said system is capable of transmitting high definition television signals where the vision information forms the analogue channel information for digitally assisted television signal, characterized in that said second information forms the digital channel information for said digitally assisted television signal which conveys control and other information for enhancement of said vision information.

13. A transmission system as claimed in claim 1, said second additional information is related to said vision information.

14. A transmission system as claimed in claim 13 in which said system is capable of transmitting high definition television signals where the vision information forms the analogue channel information for a digitally assisted television signal, characterised in that said second additional information forms the digital channel information for said digitally assisted television signal which conveys control and other information for enhancement of said vision information.

15. Television transmission apparatus for use with a transmission system as claimed in claim 1, said apparatus comprising means for generating said first information, means for assembling said first information in digital form at said first bit rate in a first portion of substantially all the lines of each television frame, means for generating vision information and means for assembling said vision information in said second portion of each of said second group of lines, characterised in that said apparatus further comprises means for generating said second information and means for assembling in the second portion of said first number of lines said second information at said second bit rate.

16. Transmission apparatus as claimed in claim 15, for use with a transmission system in which each frame comprises two television fields each containing a vertical blanking interval, wherein said means for assembling said second information assembles said second information in the second portion of said first number of lines of both vertical blanking intervals of each frame.

17. Transmission apparatus as claimed in claim 15, wherein said means for assembling said second information assembles said second information in the majority of the lines of said vertical blanking interval.

18. Transmission apparatus as claimed in claim 15, wherein said means for assembling said second information assembles said second information at a bit rate which is twice that of said first bit rate.

19. Transmission apparatus as claimed in claim 15, wherein said apparatus additionally comprises means for generating third information and means for assembling said third information in digital form at said first bit rate in the second portion of said second number of lines.

20. Transmission apparatus as claimed in claim 15, in which said vision information is derived from a high definition television signal and forms the analogue channel information for a digitally assisted television signal, wherein said apparatus further comprises means for deriving from said high definition television signal control and other information for picture enhancement which control and other information forms the said second information and constitutes the digital channel information of said digitally assisted television signal.

21. Television receiving apparatus for use with a television transmission system as claimed in claim 1, said apparatus comprising means for receiving said television signal, means for deriving from said received signal said first information and means for deriving from said received signal the vision information from the second portion of said second group of lines, wherein said apparatus further comprises means for deriving said second information from the second portion of said second number of lines.

22. Receiving apparatus as claimed in claim 21, in which said vision information forms the analogue channel information for a digitally assisted television signal, and wherein said second information comprises the digital channel information of said digitally assisted television signal, said apparatus further comprising means for deriving from said second information control and other information for enhancing the derived vision information to provide a high definition television signal.

* * * * *